United States Patent [19]

Thomassen et al.

[11] 3,712,363

[45] Jan. 23, 1973

[54] BALLISTIC DOOR FOR AIRCRAFT PROTECTIVE SHELTER

[75] Inventors: Erwin A. Thomassen, Timonium; Maurice L. Tabickman, Joppa, both of Md.

[73] Assignee: The United States of America as represented by the Secretary of the Air Force

[22] Filed: Aug. 11, 1969

[21] Appl. No.: 851,147

[52] U.S. Cl. ................................. 160/113, 160/120
[51] Int. Cl. .............................................. E06b 5/10
[58] Field of Search....49/69, 73, 103, 142, 143, 163, 49/197, 199, 358, 360, 366, 370, 98; 52/64, 80, 204, 237; 109/1, 15, 64, 67, 68, 69, 70, 71, 73, 76; 160/117, 118, 179, 150, 237; 161/404

[56] References Cited

UNITED STATES PATENTS

| | | | |
|---|---|---|---|
| 2,292,078 | 8/1942 | Inman et al. | 52/80 X |
| 2,642,162 | 6/1953 | Tobias | 52/64 |
| 2,697,054 | 12/1954 | Dietz et al. | 161/404 UX |
| 2,869,862 | 1/1959 | Urquhart | 49/199 X |
| 3,006,352 | 10/1961 | Hozak | 160/237 X |
| 3,028,639 | 4/1962 | Wheeler | 49/98 |
| 3,229,649 | 1/1966 | Baker | 109/1 |
| 3,331,425 | 7/1967 | Groves et al. | 160/237 X |

*Primary Examiner*—Stephen C. Bentley
*Attorney*—Harry A. Herbert, Jr. and Arsen Tashjian

[57] ABSTRACT

A ballistic door for an open-ended aircraft protective shelter. The door includes fixed upper and movable lower portions, both of 2 × 2 basket weave ballistic protective nylon of at least 12 plies, and means for raising and moving each movable portion to form an opening having a contour conforming to the configuration of the aircraft to be housed within the protective shelter. An end cover of water impervious flexible material may be used external of the ballistic door for protection against the weather.

2 Claims, 10 Drawing Figures

PATENTED JAN 23 1973
3,712,363
SHEET 1 OF 2
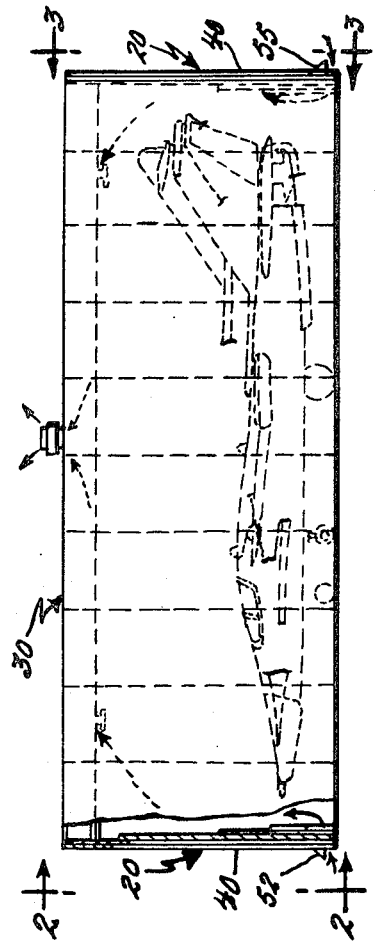
FIG. 1
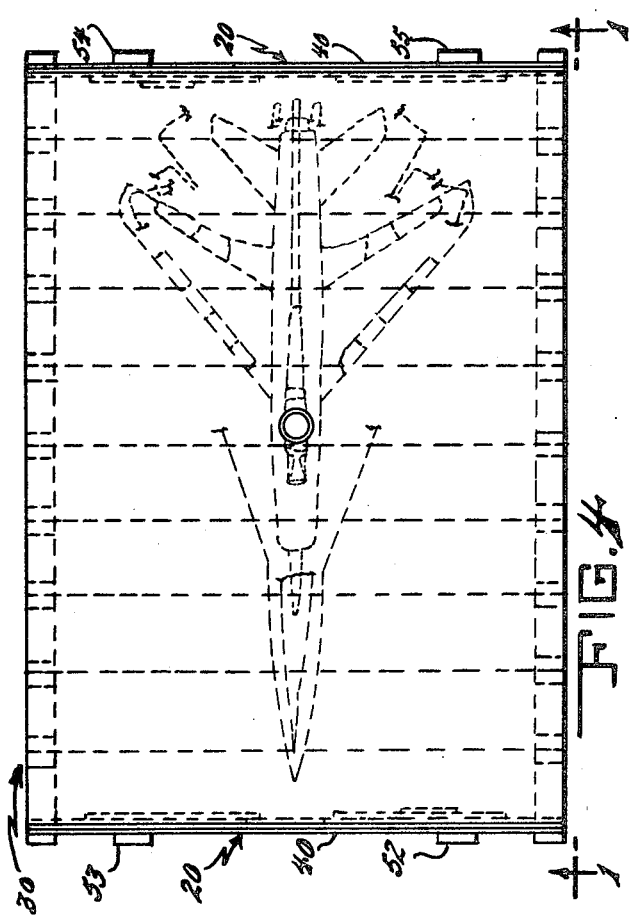
FIG. 4
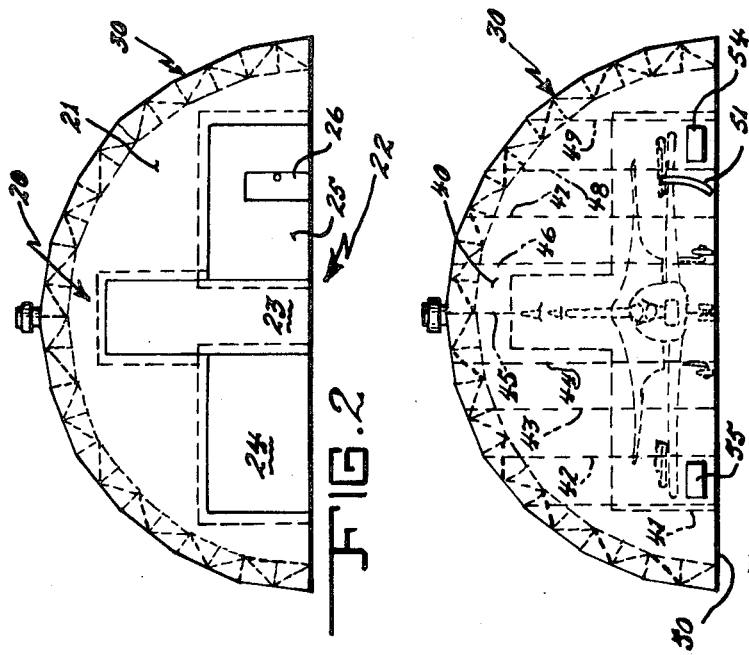
FIG. 2
FIG. 3
INVENTORS
ERWIN A. THOMASSEN
MAURICE L. TABICKMAN
BY Harry A. Herbert Jr.
and
Arsen Tashjian
ATTORNEYS

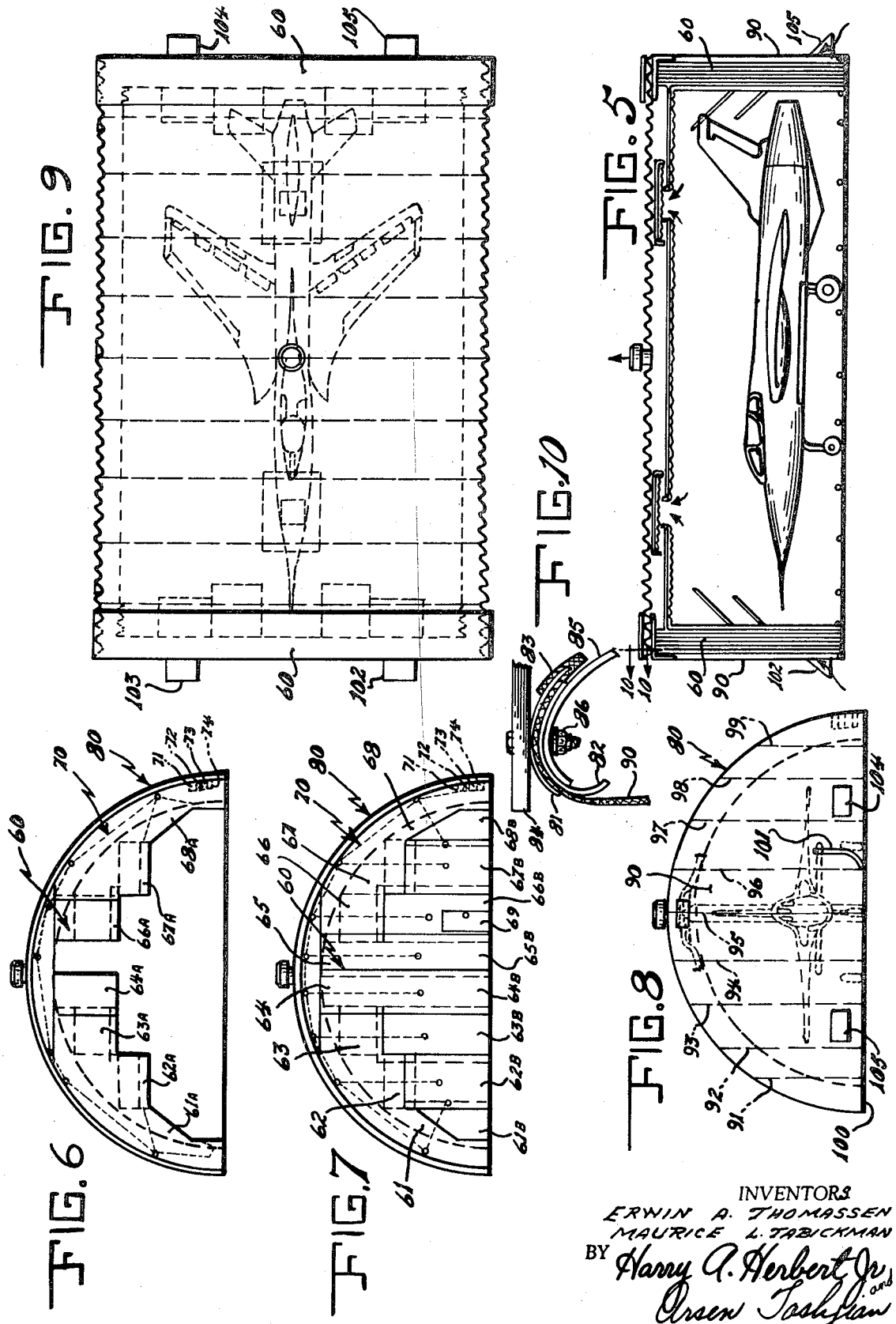

3,712,363

BALLISTIC DOOR FOR AIRCRAFT PROTECTIVE SHELTER

BACKGROUND OF THE INVENTION

This invention relates to a ballistic door and, more particularly, to a ballistic door ideally suited for an open-ended aircraft protective shelter.

In the prior art, attempts to provide doors, to give ballistic protection, for open-ended aircraft protective shelters have resulted in doors which give the desired degree of protection, but which are excessively heavy, which require special handling equipment to erect, which are difficult to manipulate after having been erected, and which are particularly vulnerable to jamming when manipulated. In addition, the door opening mechanism is usually complex; and, the door opening cannot be adequately varied to permit the easy and rapid ingress to, and egress from, the protective shelter by air craft under their own power.

This invention eliminates these and other related and associated problems; and, thereby, it significantly advances the state-of-the-art.

SUMMARY OF THE INVENTION

This invention relates to a ballistic door particularly well suited for an open-ended aircraft protective shelter.

An object of this invention is to provide a ballistic door, and operating mechanism, which is portable and hand erectable.

Another object of this invention is to provide a ballistic door the opening of which can be varied, easily and quickly, from the fully closed position to the fully open position.

Still another object of this invention is to provide a ballistic door the opening of which can be varied rapidly to form a contour conforming to the configuration of the aircraft to be housed in the protective shelter.

A further object of this invention is to provide a ballistic door which will permit the easy and rapid ingress to, and egress from, the protective shelter by aircraft under their own power.

A still further object of this invention is to allow hardening of the ballistic door to unlimited higher protective levels.

A related object is to provide an end or weather cover, external of the ballistic door, to give protection against the weather.

These, and still other, objects of this invention will become readily apparent after a consideration of the description of the invention and reference to the drawings.

DESCRIPTION OF THE DRAWINGS

FIG. 1 is a side elevation view, partly in cross-section, of an open-ended aircraft protective shelter, incorporating a preferred embodiment of the invention. Shown therein are side views of the configurations of some existing United States Government military aircraft, at rest, of varying design.

FIG. 2 is a front elevation view of the aircraft shelter shown in FIG. 1, and incorporating the same preferred embodiment of the invention shown in FIG. 1.

FIG. 3 is a rear elevation view of the aircraft shelter shown in FIG. 1, and incorporating the same preferred embodiment of the invention shown in FIG. 1. Also shown, within the shelter, are rear views of the configurations of some existing United States Government military aircraft, at rest, of varying design.

FIG. 4 is a top plan view of the aircraft shelter shown in FIG. 1, incorporating the same preferred embodiment of the invention shown in FIG. 1. Shown also, within the shelter, are top views of the configurations of some existing United States Government military aircraft, at rest, of varying design.

FIG. 5 is a side elevation view, in cross-section, of another type of open-ended aircraft shelter, incorporating another preferred embodiment of the invention. Also shown therein is a side view of the configuration of an existing United States Government military aircraft, at rest.

FIG. 6 is a front elevation view of the aircraft shelter shown in FIG. 5, incorporating the preferred embodiment of the invention shown in FIG. 5, with the embodiment in the maximum open position.

FIG. 7 is also a front elevation view of the aircraft shelter shown in FIG. 5, incorporating the preferred embodiment of the invention shown in FIG. 5, but with the embodiment in the fully closed position.

FIG. 8 is a rear elevation view of the aircraft shelter shown in FIG. 5, incorporating the same preferred embodiment of the invention shown in FIG. 5. Shown, within the shelter, is the rear view of the configuration of an existing United States military aircraft, at rest.

FIG. 9 is a top plan view of the aircraft shelter shown in FIG. 5, incorporating the preferred embodiment of the invention shown in FIG. 5. Also shown, within the shelter, is the top view of the configuration of an existing United States Government military aircraft, at rest.

FIG. 10 is an enlarged detail view of a portion of FIG. 5 taken along line 10—10 thereof.

DESCRIPTION OF THE PREFERRED EMBODIMENTS

As to Both Embodiments

Similar character references in FIGS. 1, 2, 3 and 4 denote the same components.

Similar character references in FIGS. 5, 6, 7, 8, 9 and 10 denote the same components.

By "door", as used in the phrase "ballistic door" or the like, is meant a barrier by which an entry, such as the open end of an aircraft protective shelter, may be fully closed.

By "fixed" is meant "stationary", but not necessarily "rigid" or "not removable."

By "movable" is meant the ability or capability to be "raised", "lowered", "pulled aside", "parted", and the like. As to the Embodiment Shown in FIGS. 1, 2, 3 and 4

Ballistic door 20, for open-ended aircraft protective shelter 30, includes a fixed upper portion 21 and a movable lower portion 22.

Fixed upper portion 21 comprises a plurality of sections, although it could be one piece, which are attached by suitable means to the inner periphery of one open-end of the open-ended aircraft protective shelter 30.

Movable lower portion 22 is positioned below fixed upper portion 21 and has, preferably, three (3) sections: a center section 23, and two (2) side sections 24 and 25 disposed adjacent to, and overlapping, center section 23.

The lower periphery of the fixed upper portion 21 overlaps the upper periphery of the movable lower portion 22.

Both the fixed upper portion 21 and the movable lower portion 22 are, preferably, of a non-rigid ballistic protective material, such as 12 ply 2 × 2 basket weave ballistic nylon fabric. The number of plies of ballistic protective material depends upon the degree of ballistic protection desired and the particular non-rigid ballistic protective material which is used.

Center section 23 is suspended by suitable means (not shown), such as an overhanging conveyor arrangement, which also acts as a support for center section 23 when it is raised upwardly to the open position.

Side sections 24 and 25 are suspended by suitable means (not shown), such as an "I" beam track arrangement, which permits these sections 24 and 25 to be pulled upwardly and aside and into aircraft protective shelter 20 for storage.

A collapsible personnel door 26 may be incorporated into one or more of the side sections 24 and 25.

It is here to be noted that ballistic door 20 may, in fact, comprise a multiplicity of fixed portions 21, spaced rearwardly in parallel relationship to each other, and movable portions 22, similarly spaced rearwardly in parallel relationship to each other, so that, in effect, there is a series of ballistic doors 20, one behind the other, parallel to each other and equally spaced therebetween. The number of spaced parallel ballistic doors 20 used depends upon the degree of ballistic protection desired.

Further, it is respectfully printed out that, although ballistic door 20 is shown in FIGS. 1 and 4 as being positioned at both of the open ends of aircraft protective shelter 30, the embodiment 20 could be positioned at one open end or the other open end, rather than at both of the open ends.

It may be desirable to cover an unprotected open end of protective shelter 30, or to position over, i.e., external of, ballistic door 20, and end or weather cover 40, of suitable water impervious flexible material to protect against the weather, with wire rope reinforcements, such as 41–49 inclusive, anchored across the opening of shelter 30 by means of a ground cable 50 which, in turn, is affixed to the wire rope reinforcements 41–49 inclusive, and extends from one side of the shelter opening to the other side.

A personnel entrance 51 may be incorporated into end or weather cover 40.

Collapsible or folding ventilation flaps, such as 52–55 inclusive, also may be conveniently located in end or weather cover 40.

As a related matter, although aircraft shelter 30 is shown in FIGS. 1–4 inclusive as being of the truss and corrugated aluminum industrial siding type, this is by way of illustration only and not by way of limitation. As to the Embodiment Shown in FIGS. 5, 6, 7, 8, 9 and 10

Ballistic door 60, for an open-ended aircraft protective shelter 80, comprises a plurality of suspended and marginally overlapping curtains, such as 61–68 inclusive, each having a fixed upper portion, such as 61A–68A inclusive, and a movable lower portion, such as 61B–68B inclusive. It is here to be noted that, although there are a plurality of fixed upper portions 61A–68, inclusive, the upper portion, as a whole, could be of one piece.

The movable lower portions or panels 61B-68B, inclusive, are controlled, preferably, in pairs, such as 61B and 68B, through an overhead wire rope and pulley system 70 by a suitable number of winches, such as 71, 72, 73 and 74 in this instance, since there are eight (8) movable portions 61B–68B to be controlled, i.e., drawn upwardly, lowered, or drawn aside. Similar movable panels, such as 61B and 68B, are controlled by the same winch, thereby permitting more complete control of the configuration of ballistic door 60.

Curtains 61–68 inclusive are preferably of a non-rigid ballistic protective material, such as 12 ply 2 × 2 basket weave ballistic nylon fabric.

A plurality of ballistic doors, such as 60, may be spaced rearwardly in parallel relationship to each other, so that there is, in effect, a series of ballistic doors, such as 60, one behind the other, parallel to each other, and equally spaced therebetween, preferably about (6) inches. The number of plies of each ballistic protective curtain, such as 61–68 inclusive, and the number of spaced parallel ballistic doors, such as 60, depend upon the degree of ballistic protection desired and the ballistic characteristics of the particular non-rigid ballistic protective material which is used.

A collapsible personnel door 69 may be incorporated into one or more of the movable portions 61B–68 inclusive, such as 66B in this instance.

It is also to be noted as to this embodiment that, although the embodiment 60 is shown as being positioned at both of the open ends of aircraft protective shelter 80, the embodiment 60 can be positioned at one open end or at the other open end, rather than at both of the open ends.

It may be desirable to cover an unprotected open end of protective shelter 30, or to position over the ballistic door 60, an end cover or weather cover 90, of suitable water impervious flexible material, with wire rope reinforcements, such as 91–99 inclusive, anchored across the opening of shelter 80 by means of a ground cable 100 which, in turn, is affixed to wire rope reinforcements 91–99 inclusive and extends from one side of the shelter opening to the other side.

A personnel entrance 101 may be incorporated into end cover or weather cover 90.

Collapsible or folding ventilation flaps, such as 102–105 inclusive, may be incorporated in ballistic door 60 and weather cover 90.

As a related matter, although aircraft shelter 80 is shown in FIGS. 5–10 inclusive as of the Doron-aluminum outer shell and nylon-aluminum inner shell type, this is by way of illustration only and not by way of limitation.

With specific reference to FIG. 10, therein is shown, in the interest of clarity, an enlarged detail view of a portion of FIG. 5 taken along line 10—10 thereof. End cover 90 is positioned between doubler 81, guard 82 and, at one end, by end cover retainer 83, all of which are also positioned between the Doron-aluminum protective outer shell 84 and end arch panel 85 and are held therebetween by attachment device 86.

MODE OF OPERATION OF THE PREFERRED EMBODIMENTS

The method of operation of the preferred embodiments is essentially the same. In essence, the movable portions of the embodiments, such as 23, 24 and 25, FIG. 2, and 61B–68B inclusive, FIG. 8, are raised (or pulled aside, as applicable) to permit the easy and rapid ingress to, and egress from, the aircraft protective shelter, such as 30, FIGS. 1–4 inclusive, and 80, FIGS. 5–9 inclusive. To give maximum ballistic protection to the aircraft during ingress or egress, movable portions 23, 24 and 25, FIG. 2, of embodiment 20 and 61B–68B inclusive, FIG. 8, of embodiment 60 are raised, or pulled aside, to form an opening having a contour conforming to the configuration of the aircraft which is entering or leaving the aircraft protective shelter, such as 30, FIGS. 1–4 inclusive, and 80, FIGS. 5–9 inclusive. To give ballistic protection to the aircraft while it is housed within the aircraft protective shelter, the movable portions of the embodiments are lowered to form a full length ballistic door, such as 20, FIGS. 1, 2 and 3, and such as 60, FIGS. 5, 7 and 9.

An end cover or weather cover, such as 40, FIGS. 1, 3 and 4, and such as 90, FIGS. 5 and 8, may be used either independently of, or in conjunction with (and external of), the ballistic door 20, FIGS. 1, 2 and 3, and such as 60, FIGS. 5, 7 and 9, to give protection against the weather. When the end or weather cover is used, and if necessary to move it (since, obviously, there are many situations when movement may not be necessary), suitable means to raise it, part it, or remove it in its entirety are used.

While there has been shown and described the fundamental features of our invention, as applied to particular embodiments, it is to be understood that this is by way of illustration only and is not intended as a limitation, and that various substitutions and omissions may be made by those skilled in the art without departing from the spirit of the invention. Additionally, although reference has been made, in describing the preferred embodiments, as to the use of our invention in the aircraft protective shelter art, it is obvious that this is but one application of our invention. For example, our invention may be used or adapted for use for the ballistic protection of warehouses, garages, and the like in combat zones, or at construction sites where ballistic like fragments may result from on-site detonations necessary to the construction.

What we claim is:

1. A ballistic door, for use at the open ends of an open-ended aircraft protective shelter, comprising
    a. a fixed upper portion of a multiplicity of plies of non-rigid ballistic nylon of 2×2 basket weave attached by suitable means to the inner periphery of an open end of the open-ended aircraft protective shelter, with said fixed upper portion comprising a plurality of sections;
    b. a movable lower portion of a multiplicity of plies of non-rigid ballistic nylon of 2×2 basket weave positioned by suitable means below said fixed upper portion, with the upper periphery of said movable lower portion overlapping the lower periphery of said fixed upper portion, with said movable lower portion comprising a center section, and two side sections adjacent to and overlapping said center section;
    c. means for raising and lowering said center section of said movable lower portion;
    d. and, means for pulling upwardly and aside and for releasing said side sections of said movable lower portion; with said sections of said movable lower portion capable of being raised, lowered, pulled upwardly and aside and released so as to form an opening having a contour conforming to a desired configuration.

2. A plurality of ballistic doors comprising individual ballistic doors, as set forth in claim 1, with each said individual ballistic door of said plurality of ballistic doors spaced rearwardly in parallel relationship to each other and equally spaced therebetween.

* * * * *